US008249594B2

(12) United States Patent
Vikberg et al.

(10) Patent No.: US 8,249,594 B2
(45) Date of Patent: Aug. 21, 2012

(54) METHOD AND SYSTEM TO ASSIGN MOBILE STATIONS TO AN UNLICENSED MOBILE ACCESS NETWORK CONTROLLER IN AN UNLICENSED RADIO ACCESS NETWORK

(75) Inventors: Jari Vikberg, Järna (SE); Magnus Hallenstål, Täby (SE); Peter Öhman, Enebyberg (SE); Tomas Nylander, Värmdö (SE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 0 days.

(21) Appl. No.: 13/046,880

(22) Filed: Mar. 14, 2011

(65) Prior Publication Data

US 2011/0212725 A1 Sep. 1, 2011

Related U.S. Application Data

(63) Continuation of application No. 11/574,493, filed on Feb. 28, 2007, now abandoned.

(51) Int. Cl.
*H04W 4/00* (2009.01)
*H04W 36/00* (2009.01)
*H04W 40/00* (2009.01)

(52) U.S. Cl. .................. 455/435.1; 455/436; 455/426.1; 455/432.2; 455/445; 370/331; 370/338

(58) Field of Classification Search .................. 455/436, 455/426.1, 432.2, 435.1, 445, 439, 438; 370/331, 370/338

See application file for complete search history.

(56) References Cited

U.S. PATENT DOCUMENTS 7,835,317 B2 * 11/2010 Ahmavaara et al. .......... 370/328
2003/0119481 A1 * 6/2003 Haverinen et al. ............ 455/411
2003/0119527 A1 * 6/2003 Labun et al. .................. 455/456
2004/0116120 A1 * 6/2004 Gallagher et al. ............ 455/436
2005/0117540 A1 * 6/2005 Kuchibhotla et al. ......... 370/329
2005/0233729 A1 * 10/2005 Stojanovski et al. ......... 455/411

FOREIGN PATENT DOCUMENTS

WO WO 2005/079087 8/2005

OTHER PUBLICATIONS

U.S. Appl. No. 11/574,493, filed Feb. 28, 2007, All Documents Cited in Parent Application.
Unlicensed Mobile Access (UMA) Architecture (Stage 2). R1.0.1 Oct. 8, 2004. XP002381341.
Ala-Laurila, et al.: "Wireless LAN Access Network Architecture for Mobile Operators", IEEE Communication Magazine, Nov. 1, 2001.
Kasari, et al.: "Applying Radius based Public Access Roaming in the Finnish University Network(FUNET)", Proceedings of the TERENA Networking Conference, Tampere, Finland, May 22, 2003.

* cited by examiner

*Primary Examiner* — Marisol Figueroa
*Assistant Examiner* — Dung Hong

(57) ABSTRACT

The present invention provides a method and architecture on how mobile stations (MS) are provisioned about information of an unlicensed mobile access (UMA) network controller (UNC). The UNC in accordance with the present invention provides three different logical roles (i.e., provisioning, default and serving). More specifically, the present invention provides a method for assigning a mobile station (MS) to an unlicensed mobile access (UMA) network controller (UNC) in an unlicensed mobile access network (UMAN). The MS is connected to a provisioning UNC and discovers a default UNC. A serving UNC is then determined to assign the MS to and the MS is assigned to the serving UNC. The serving UNC can be the default UNC, the provisioning UNC or another UNC.

11 Claims, 10 Drawing Sheets

100
HLR
112
VLR
114
VLR
116
MSC
108
SGSN
118
LA2
MSC
110
SGSN
120
LA1
CORE NETWORK
104
A
Gb
A
Gb
A
Gb
A
Gb
UNC
146
UNC
144
UNC
142
IP Network
148
UMAN
102
AP
140
AP
138
AP
136
AP
134
BSC
124
BSS
122
106
Abis
Abis
Abis
BTS
130
BTS
128
BTS
126
X
Um
MS
132

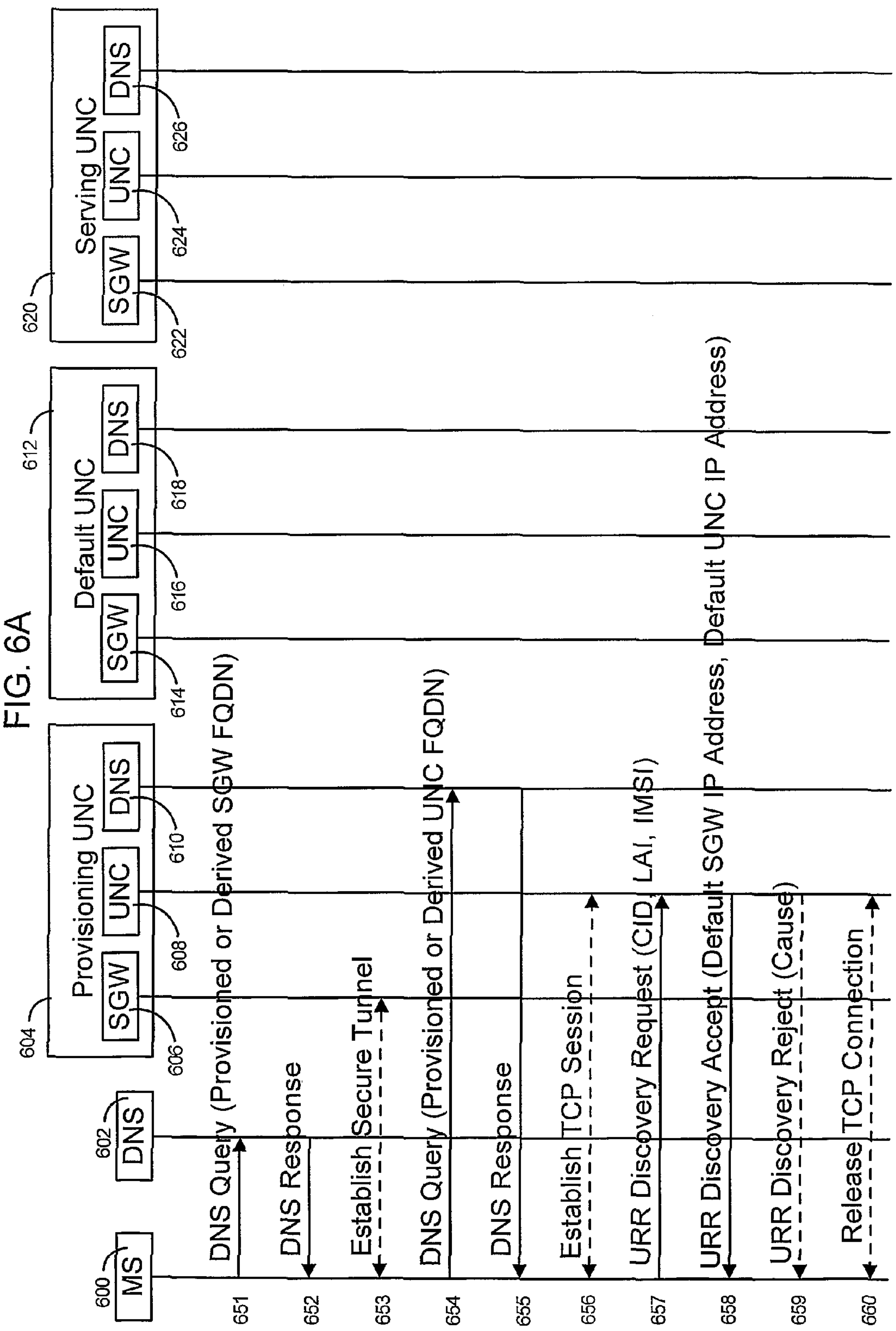
FIG. 6A
MS
600
DNS
602
Provisioning UNC
604
SGW
606
UNC
608
DNS
610
Default UNC
612
SGW
614
UNC
616
DNS
618
Serving UNC
620
SGW
622
UNC
624
DNS
626
651 DNS Query (Provisioned or Derived SGW FQDN)
652 DNS Response
653 Establish Secure Tunnel
654 DNS Query (Provisioned or Derived UNC FQDN)
655 DNS Response
656 Establish TCP Session
657 URR Discovery Request (CID, LAI, IMSI)
658 URR Discovery Accept (Default SGW IP Address, Default UNC IP Address)
659 URR Discovery Reject (Cause)
660 Release TCP Connection

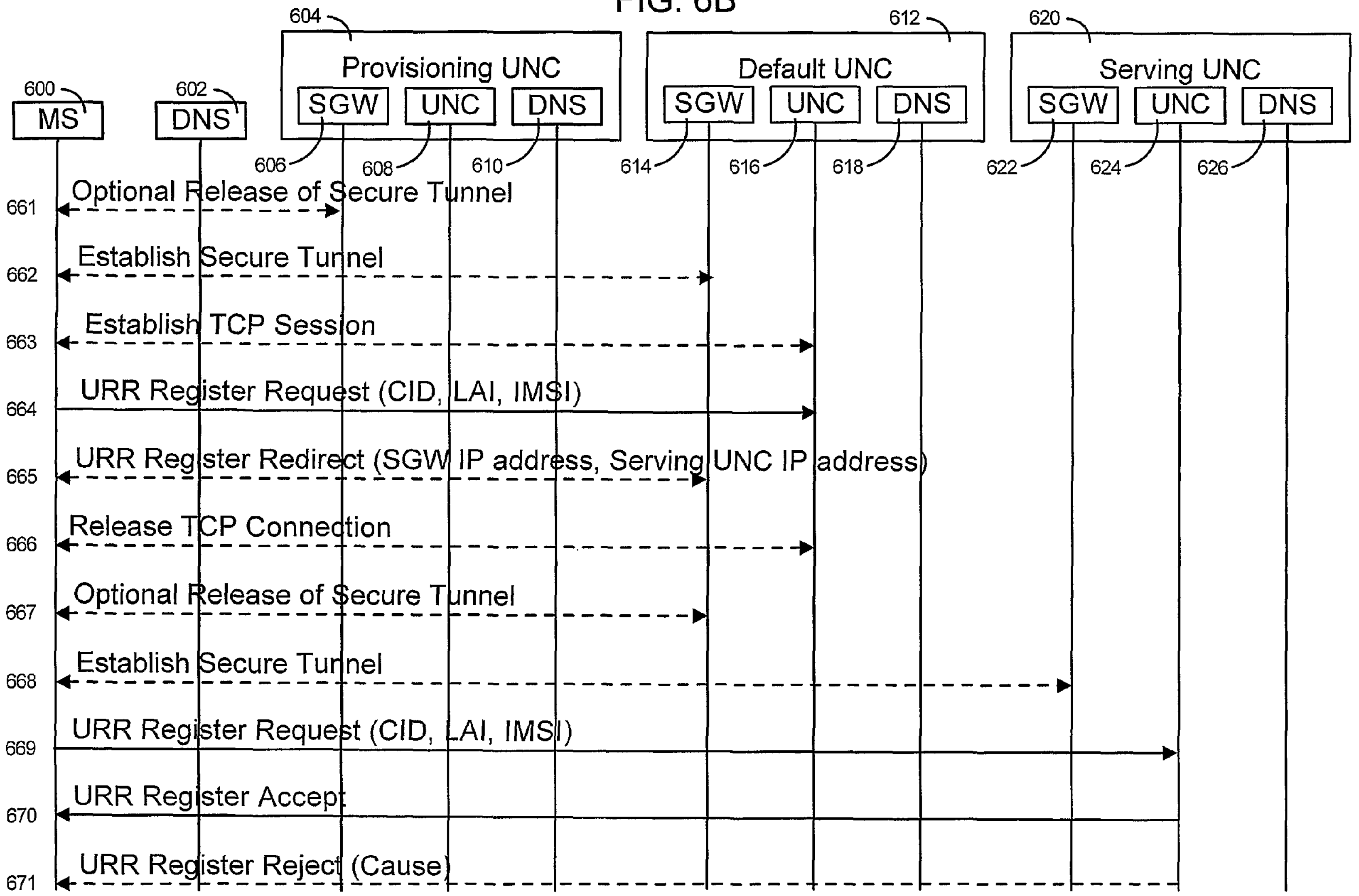
FIG. 6B
600
MS
602
DNS
604
Provisioning UNC
SGW
UNC
DNS
606
608
610
612
Default UNC
SGW
UNC
DNS
614
616
618
620
Serving UNC
SGW
UNC
DNS
622
624
626
661 Optional Release of Secure Tunnel
662 Establish Secure Tunnel
663 Establish TCP Session
664 URR Register Request (CID, LAI, IMSI)
665 URR Register Redirect (SGW IP address, Serving UNC IP address)
666 Release TCP Connection
667 Optional Release of Secure Tunnel
668 Establish Secure Tunnel
669 URR Register Request (CID, LAI, IMSI)
670 URR Register Accept
671 URR Register Reject (Cause)

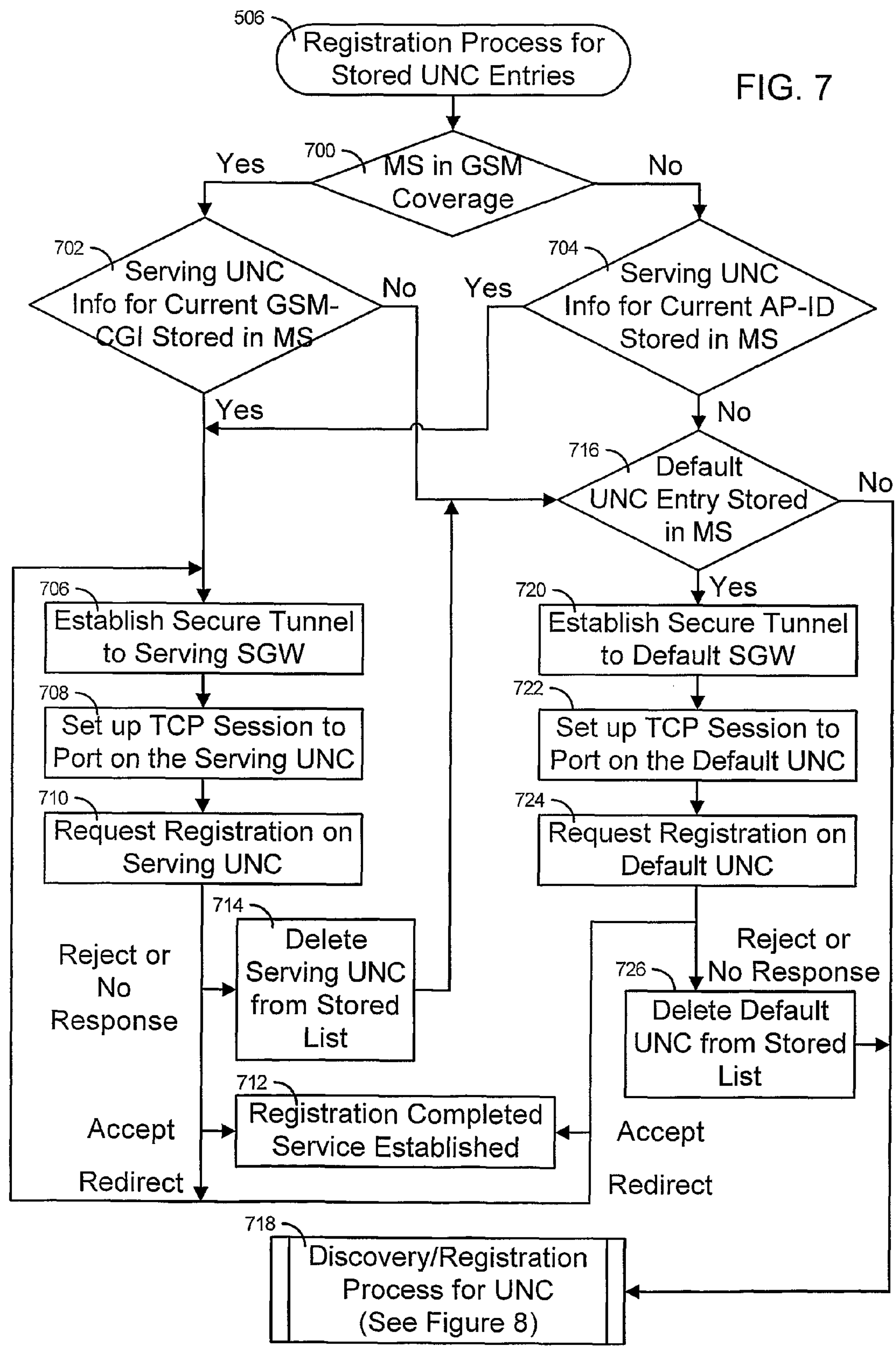
FIG. 7
506
Registration Process for Stored UNC Entries
700
MS in GSM Coverage
Yes
No
702
Serving UNC Info for Current GSM-CGI Stored in MS
704
Serving UNC Info for Current AP-ID Stored in MS
No
Yes
Yes
No
716
Default UNC Entry Stored in MS
No
Yes
706
Establish Secure Tunnel to Serving SGW
708
Set up TCP Session to Port on the Serving UNC
710
Request Registration on Serving UNC
720
Establish Secure Tunnel to Default SGW
722
Set up TCP Session to Port on the Default UNC
724
Request Registration on Default UNC
Reject or No Response
714
Delete Serving UNC from Stored List
Reject or No Response
726
Delete Default UNC from Stored List
712
Registration Completed Service Established
Accept
Accept
Redirect
Redirect
718
Discovery/Registration Process for UNC (See Figure 8)

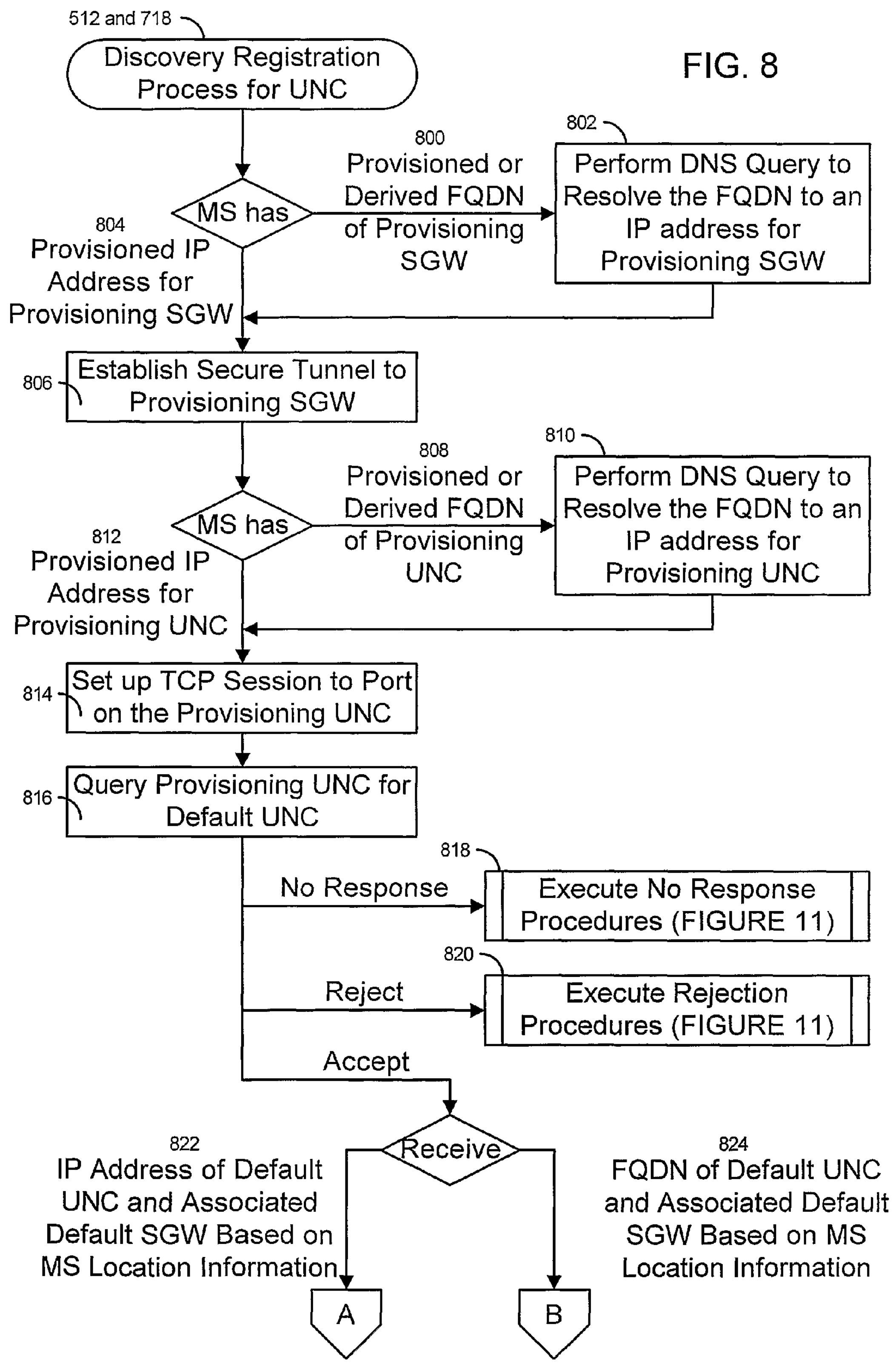

FIG. 8
512 and 718
Discovery Registration Process for UNC
804
MS has
Provisioned IP Address for Provisioning SGW
800
Provisioned or Derived FQDN of Provisioning SGW
802
Perform DNS Query to Resolve the FQDN to an IP address for Provisioning SGW
806
Establish Secure Tunnel to Provisioning SGW
812
MS has
Provisioned IP Address for Provisioning UNC
808
Provisioned or Derived FQDN of Provisioning UNC
810
Perform DNS Query to Resolve the FQDN to an IP address for Provisioning UNC
814
Set up TCP Session to Port on the Provisioning UNC
816
Query Provisioning UNC for Default UNC
No Response
818
Execute No Response Procedures (FIGURE 11)
Reject
820
Execute Rejection Procedures (FIGURE 11)
Accept
Receive
822
IP Address of Default UNC and Associated Default SGW Based on MS Location Information
824
FQDN of Default UNC and Associated Default SGW Based on MS Location Information
A
B

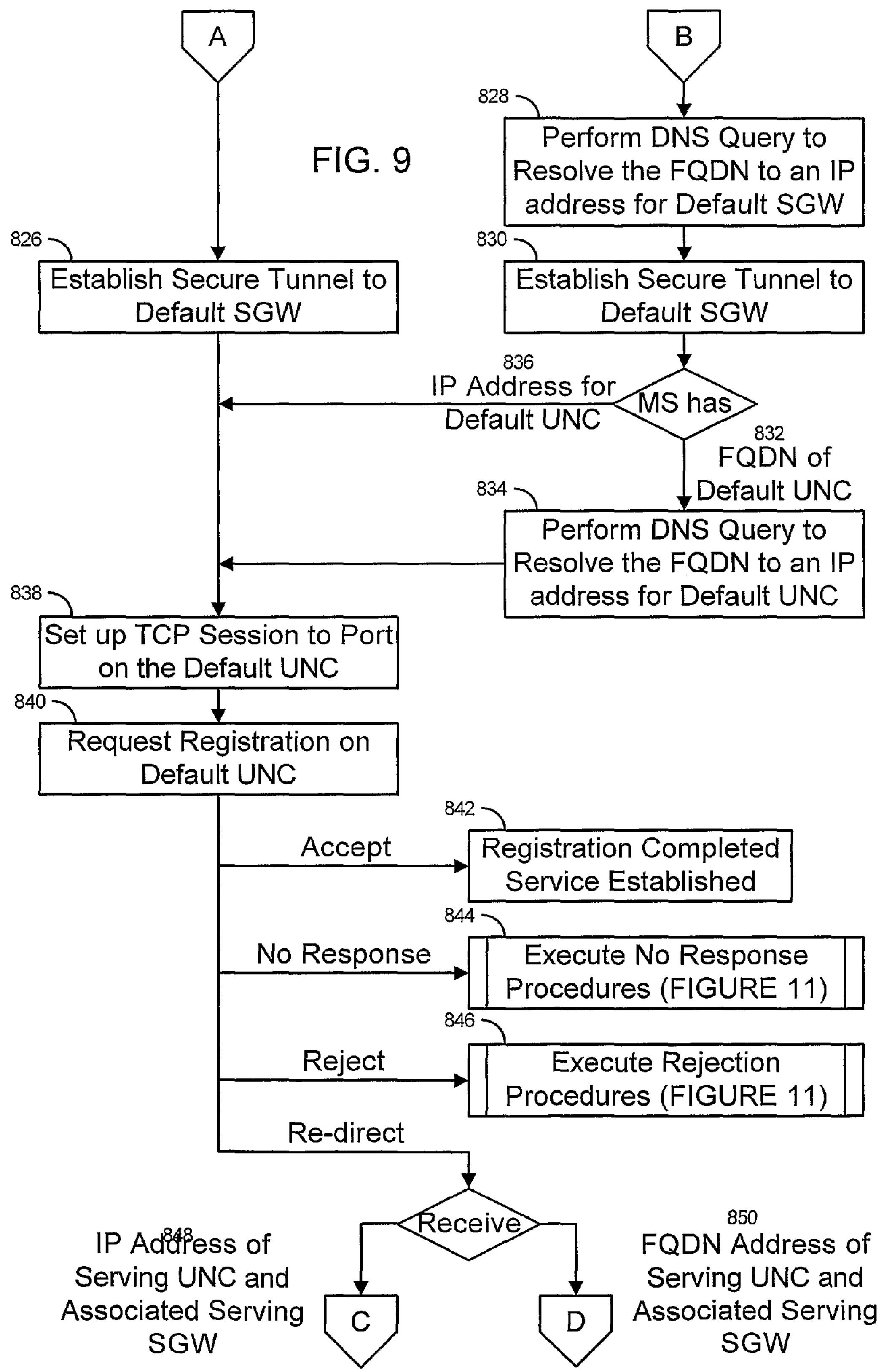
A
B
FIG. 9
828
Perform DNS Query to Resolve the FQDN to an IP address for Default SGW
826
Establish Secure Tunnel to Default SGW
830
Establish Secure Tunnel to Default SGW
836
IP Address for Default UNC
MS has
832
FQDN of Default UNC
834
Perform DNS Query to Resolve the FQDN to an IP address for Default UNC
838
Set up TCP Session to Port on the Default UNC
840
Request Registration on Default UNC
842
Accept
Registration Completed Service Established
844
No Response
Execute No Response Procedures (FIGURE 11)
846
Reject
Execute Rejection Procedures (FIGURE 11)
Re-direct
Receive
848
IP Address of Serving UNC and Associated Serving SGW
C
D
850
FQDN Address of Serving UNC and Associated Serving SGW

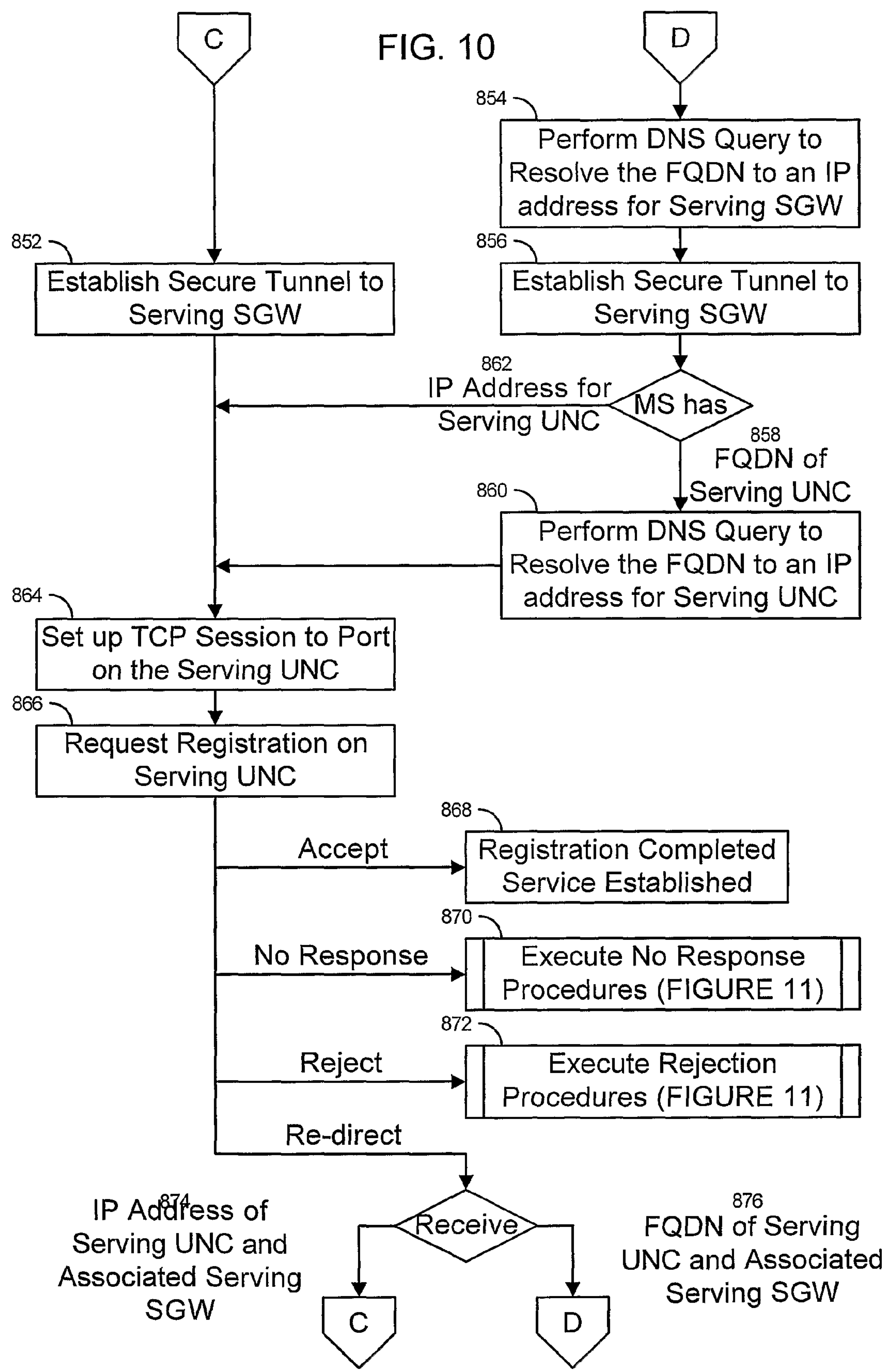

FIG. 10
C
D
854
Perform DNS Query to Resolve the FQDN to an IP address for Serving SGW
852
Establish Secure Tunnel to Serving SGW
856
Establish Secure Tunnel to Serving SGW
862
IP Address for Serving UNC
MS has
858
FQDN of Serving UNC
860
Perform DNS Query to Resolve the FQDN to an IP address for Serving UNC
864
Set up TCP Session to Port on the Serving UNC
866
Request Registration on Serving UNC
868
Accept
Registration Completed Service Established
870
No Response
Execute No Response Procedures (FIGURE 11)
872
Reject
Execute Rejection Procedures (FIGURE 11)
Re-direct
874
IP Address of Serving UNC and Associated Serving SGW
Receive
876
FQDN of Serving UNC and Associated Serving SGW
C
D

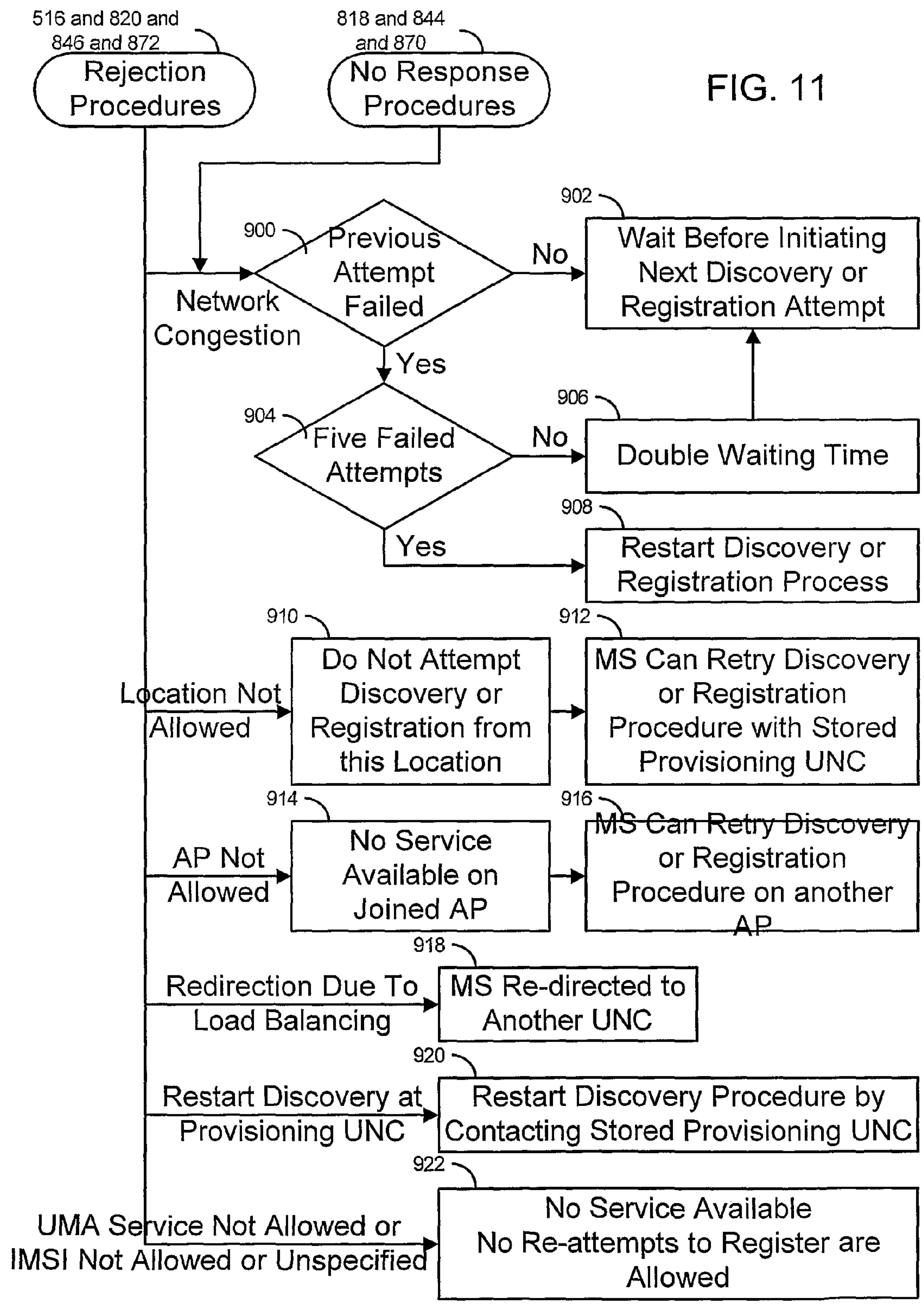

516 and 820 and 846 and 872
Rejection Procedures
818 and 844 and 870
No Response Procedures
FIG. 11
900
Previous Attempt Failed
Network Congestion
No
902
Wait Before Initiating Next Discovery or Registration Attempt
Yes
904
Five Failed Attempts
No
906
Double Waiting Time
Yes
908
Restart Discovery or Registration Process
910
Location Not Allowed
Do Not Attempt Discovery or Registration from this Location
912
MS Can Retry Discovery or Registration Procedure with Stored Provisioning UNC
914
AP Not Allowed
No Service Available on Joined AP
916
MS Can Retry Discovery or Registration Procedure on another AP
918
Redirection Due To Load Balancing
MS Re-directed to Another UNC
920
Restart Discovery at Provisioning UNC
Restart Discovery Procedure by Contacting Stored Provisioning UNC
922
UMA Service Not Allowed or IMSI Not Allowed or Unspecified
No Service Available No Re-attempts to Register are Allowed

METHOD AND SYSTEM TO ASSIGN MOBILE STATIONS TO AN UNLICENSED MOBILE ACCESS NETWORK CONTROLLER IN AN UNLICENSED RADIO ACCESS NETWORK

CROSS-REFERENCE TO RELATED APPLICATIONS

This application is a continuation application which claims the benefit of U.S. patent application Ser. No. 11/574,493 filed on Feb. 28, 2007, now abandoned the disclosure of which is fully incorporated herein by reference.

FIELD OF INVENTION

The present invention relates in general to the field of mobile communications and, more particularly, to a method and system to assign mobile stations to an unlicensed mobile access network controller in an unlicensed radio access network.

BACKGROUND ART

In any mobile communication system, such as a Global System for Mobile communications (GSM) network, active calls conducted between a mobile station (MS) and a base station need to be handed over to a different base station as the mobile station moves between different coverage areas, or cells. Depending on how each cell is defined, handover may require the active call to be re-routed simply through a different base station transceiver (BTS), through a different base station controller (BSC) or through a different mobile services switching center (MSC). Handover may also be necessary when capacity problems are met in any one cell.

Handover necessitates a certain amount of operation and maintenance activities on installation of a system, such as defining neighboring cells, as well as the BSC and MSC that controls the cell, defining which cell frequencies should be measured and what threshold value to use to initiate handover. In a conventional GSM network the BSC sends a MS a list of predetermined frequencies to be measured. Two lists may be sent out, a first list being used for idle mode, such as when the MS is roaming, and a second used for active mode when a call is ongoing. This second list defines which frequencies the MS should measure and report back on. These lists contain a set of values that refer to absolute radio frequency channel numbers (ARFCN) of neighboring cells. In addition to these frequency channel numbers the BSC also knows base station identity codes (BSIC) of all neighbouring cells. The MS measures the frequencies defined by these channel numbers and reports these measurements to the BSC. In practice, the MS will report on only the six best measurement values and only for those cell frequencies with which the MS can synchronize and consequently receive a BSIC. The measurement report sent back to the BSC by the MS includes a reference to the ARFCN, the BSIC and an indication of the received downlink signal strength. In fact the report does not specify the exact ARFCN but rather refers to the position this number occupied in the measurement list. On the basis of this report, the BSC decides whether handover is necessary and to which cell. The initiation of handover is performed according to the standard GSM mechanism for each vendor. Specifically, a message is sent by the base station controller to the MSC connected to the BSC indicating that handover is required. This message contains a cell identifier, encompassed in a cell global identity (CGI), which defines the mobile country code, mobile network code, location area code and cell identifier for the cell to which handover is requested. The CGI is fetched by the BSC from a list using the BSIC and ARFCN obtained for the cell. With this CGI the MSC is able to determine which other MSC handles the cell defined by the CGI value.

Recently proposals have been made to extend conventional cellular networks by including access networks that utilize a low power unlicensed-radio interface to communicate with MSs. The unlicensed mobile access (UMA) networks (UMANs) are designed to be used together with the core elements of a standard public mobile network and consist essentially of plug-in low-power unlicensed radio transceivers, or access points (AP), each designed to establish an unlicensed radio link with a MS and a controller or interface node connecting the unlicensed radio transceivers with the mobile core network. Suitable unlicensed-radio formats include digital enhanced cordless telecommunications (DECT), wireless local area network (WLAN) and Bluetooth. An adapted mobile handset capable of operating over both the standard air interface (e.g., the Um interface) and the unlicensed-radio interface means that the subscriber requires only one phone for all environments. The UMA network is constructed so that the core elements, such as the MSCs, of the public mobile network views the interface node as a conventional BSC. Such a UMA network and the MS for use with this UMA network are described in European patent application No. EP-A-1 207 708. The content of this application is incorporated herein by reference.

The low power and resultant low range of the unlicensed-radio interface means that several such UMA networks may be provided in relatively close proximity, for example one access network per floor of an office building or in a private home. The connection between the unlicensed-radio transceivers and the associated unlicensed network controller (UNC) is provided by a fixed broadband network. Preferably, communication over this network uses the internet protocol (IP), which greatly facilitates the installation of the UMA network, permitting a subscriber to plug-in an unlicensed-radio transceiver or in his own home and consequently install an unlicensed-radio access point (AP) himself. However, the flexibility of such UMA networks also presents difficulties. Since an access point can be freely installed and moved by a subscriber to a separate city, state or even country, yet still connect to its original UNC, the exact location of the AP cannot be tracked by the core network. This imposes huge demands on the operation and maintenance activities required for handover to and from the UMA network, as neighboring cells may change frequently. Also billing restraints in some areas may require the re-assignment of a relocated AP to a more appropriate UNC, particularly if revenue from calls originating from a specific AP must be accounted for in a specific region of a country. As a result, the configuration and relocation of MSs as they move in and out of APs and UMA networks poses a significant challenge to the expansion of services to UMA networks.

SUMMARY OF THE INVENTION

The present invention provides a method and architecture on how mobile stations (MS) are provisioned about information of an unlicensed mobile access (UMA) network controller (UNC). The UNC in accordance with the present invention provides three different logical roles (i.e., provisioning, default and serving). This logical division of roles in the UMA network improves network performance, improves reliability, provides improved load balancing, minimizes delays, provides emergency call services, and determines MS positioning. For example, these procedures provide failure fallback mechanisms that allow a MS to fallback to a default UNC when the serving UNC fails or even to the provisioning UNC as a last resort. Accordingly, the present invention provides various procedures performed by the MS and the different UNCs with respect to one another. In addition, the present invention provides a method for the MS to contact the provisioning UNC to discover the default UNC that will be used to find the correct serving UNC.

The procedures performed by the MS and the UNCs to assign the MS to a UNC are important for several reasons. First, the UNC is informed that a MS is now connected through a particular access point (AP) and is available at a particular Transmission Control Protocol (TCP). This information allows the UNC to provide various services to the MS, e.g., mobile-terminated calls, etc. Second, the UNC provides the MS with the operating parameters associated with the UMA service. For example, the "GSM System Information" message content that is applicable in UMA mode is delivered to the MS during the UMA registration process. Third, the MS provides the appropriate information during registration to support UNC redirection based on various operating policies.

More specifically, the present invention provides a method for assigning a mobile station (MS) to an unlicensed mobile access (UMA) network controller (UNC) in an unlicensed mobile access network (UMAN). The MS is connected to a provisioning UNC and discovers a default UNC. A serving UNC is then determined to assign the MS to and the MS is assigned to the serving UNC. The serving UNC can be the default UNC, the provisioning UNC or another UNC.

In addition, the present invention provides a method for assigning a MS to an UNC in an UMAN by joining the MS to the UMAN via an AP and attempting a discovery/registration process for one or more UNCs and assigning the MS to one of the UNC whenever the discovery/registration process is successful. The registration process can be attempted for one or more previously connected UNC whose locations are stored on the MS and assigning the MS to the previously connected UNC whenever the registration process is successful. One or more rejection procedures are implemented whenever the discovery/registration process is unsuccessful. The above described methods can be implemented using a computer program embodied on a computer readable medium wherein each step is executed by one or more code segments.

Moreover, the present invention provides an apparatus within an UMA network that facilitates the assignment of one or more MSs within the UMA network. The apparatus includes an UNC that is assigned one or more logical roles selected from a group of provisioning, default or serving. The logical roles of provisioning, default and serving are distributed over one or more UNC. The UNC is a provisioning UNC with respect to a first set of MS, a default UNC with respect to a second set of MSs, and a serving UNC with respect to a third set of MSs.

Furthermore, the present invention provides an unlicensed-radio access system connected to a core network portion of a licensed mobile network. The unlicensed-radio access system includes one or more APs adapted to communicate with MSs over an unlicensed-radio interface, one or more UNC connected to the core network portion of the licensed mobile network and a fixed broadband network connected to both the APs and the UNCs, wherein the UNCs provide the logical roles of provisioning, default and serving in order to facilitate the assignment of the MSs within the UMA network.

BRIEF DESCRIPTION OF THE DRAWINGS

Further benefits and advantages of the present invention will become more apparent from the following description of various embodiments that are given by way of example with reference to the accompanying drawings:

FIGS. 6A and 6B depict representative signaling sequences in accordance with the present invention;

FIG. 7 is a flow chart depicting a registration process for UNC entries stored in a MS in accordance with one embodiment of the present invention;

FIGS. 8, 9 and 10 are flow charts depicting a UNC discovery/registration process for a MS in accordance with one embodiment of the present invention; and FIG. 11 is a flow chart depicting rejection and no response procedures in accordance with one embodiment of the present invention.

DESCRIPTION OF THE INVENTION

While the making and using of various embodiments of the present invention are discussed in detail below, it should be appreciated that the present invention provides many applicable inventive concepts that can be embodied in a wide variety of specific contexts. The specific embodiments discussed herein are merely illustrative of specific ways to make and use the invention and do not delimit the scope of the invention. To facilitate the understanding of this invention, a number of terms are defined below. Terms defined herein have meanings as commonly understood by a person of ordinary skill in the areas relevant to the present invention. Terms such as "a", "an" and "the" are not intended to refer to only a singular entity, but include the general class of which a specific example may be used for illustration. The terminology herein is used to describe specific embodiments of the invention, but their usage does not delimit the invention, except as outlined in the claims.

The present invention provides a method and architecture on how mobile stations (MS) are provisioned about information of an unlicensed mobile access (UMA) network controller (UNC). The UNC in accordance with the present invention provides three different logical roles (i.e., provisioning, default and serving). This logical division of roles in the UMA network improves network performance, improves reliability, provides improved load balancing, minimizes delays, provides emergency call services, and determines MS positioning. For example, these procedures provide failure fallback mechanisms that allow a MS to fallback to a default UNC when the serving UNC fails or even to the provisioning UNC as a last resort. Accordingly, the present invention provides various procedures performed by the MS and the different UNCs with respect to one another. In addition, the present invention provides a method for the MS to contact the provisioning UNC to discover the default UNC that will be used to find the correct serving UNC.

The procedures performed by the MS and the UNCs to assign the MS to a UNC are important for several reasons. First, the UNC is informed that a MS is now connected through a particular access point (AP) and is available via a particular Transmission Control Protocol (TCP) connection. The TCP connection is maintained between the MS and the UNC as long as the MS is registered at the UNC. This information allows the UNC to provide various services to the MS, e.g., mobile-terminated calls, etc. Second, the UNC provides the MS with the operating parameters associated with the UMA service. For example, the "GSM System Information" message content that is applicable in UMA mode is delivered to the MS during the UMA registration process. Third, the MS provides the appropriate information during registration to support UNC redirection based on various operating policies.

Figure 1:
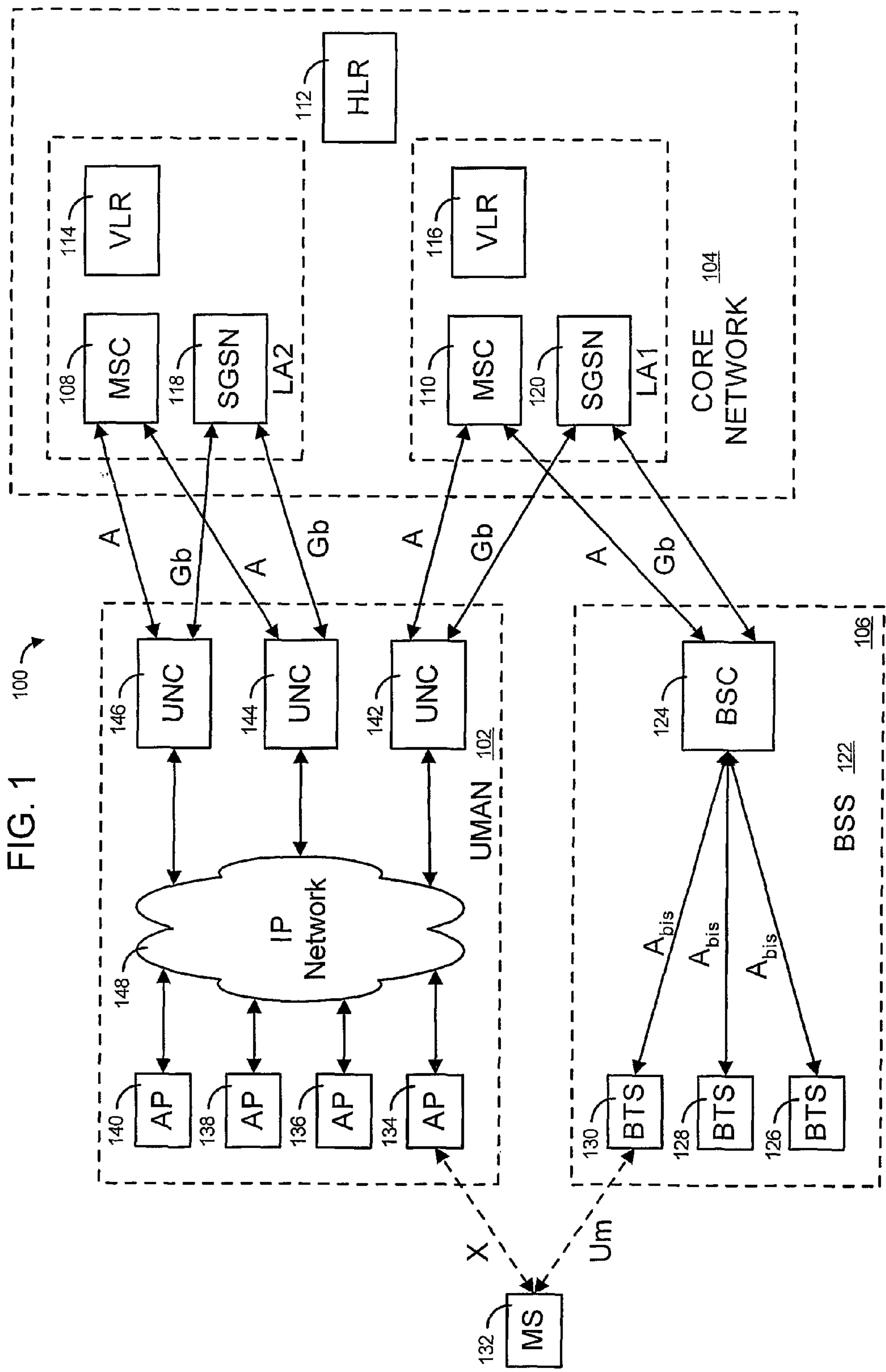
FIG. 1 is a block diagram depicting parts of a GSM network with a UMA network in accordance with the present invention.

Referring now to FIG. 1, a block diagram depicting parts of a GSM network 100 with a UMA network 102 in accordance with the present invention is shown. The GSM network 100 is essentially divided into a core network portion 104 and an access portion 106. The elements of the core network 104 include the mobile switching centers (MSC) 108 and 110, associated home location register (HLR) 112 and visitor location registers (VLR) 114 and 116. The function and structure of these conventional GSM architecture elements are known to those in the art and will not be described in further detail here. The core network 104 also supports the General Packet Radio Service (GPRS), and to this end serving GPRS support nodes (SGSN) 118 and 120 are illustrated. Although not illustrated in the figure, it will be understood by those skilled in the art that the core network 104 may include access to other mobile and fixed-line networks, such as ISDN and PSTN networks, packet and circuit switched packet data networks such as intranets, extranets and the Internet through one or more gateway nodes.

The access portion 106 essentially consists of multiple base station subsystems (BSS) 122, only one of which is illustrated. The BSS 122 includes one or more base station controllers (BSC) 124 and one or more base transceiver stations (BTS) 126, 128 and 130. The BSS 122 or BSC 124 communicates via defined fixed standard A and Gb interfaces with MSC 110 and SGSN 120, respectively in the core network portion 104. The BSC 124 communicates with the one or more BTS 126, 128 and 130 via the defined $A_{bs}$ air interface. The BTS 130 communicates with mobile stations or terminals (MS or MT 132 over the GSM standard $U_m$ radio air interface. Note that the BSC 124 is often separate from the BTSs 126, 128 and 130 and may even be located at the MSC 110. The physical division depicted in FIG. 1 serves to distinguish between the parts of the network making up the access network portion 106 and those that form the core network portion 104.

In addition to the standard access network portion provided by the BSS 122, the network depicted in FIG. 1 further includes an unlicensed-radio access network (UMAN 102). The components making up this UMAN 102 also enable the MS 132 to access the GSM core network 104, and through this, other communication networks via an unlicensed-radio interface X. A used herein, unlicensed-radio means any radio protocol that does not require the operator running the mobile network to have obtained a license from the appropriate regulatory body. In general, such unlicensed-radio technologies must be low power and thus of limited range compared to licensed mobile radio services. This means that the battery lifetime of mobile terminals will be greater. Moreover, because the range is low the unlicensed-radio may be a broadband radio, thus providing improved voice quality. The radio interface may utilize any suitable unlicensed-radio protocol, for example a wireless LAN protocol, Bluetooth radio or Digital Enhanced Cordless Telecommunications (DECT). These radios have higher bandwidth and lower power consumption than conventional public mobile network radio.

The Bluetooth standard specifies a two-way digital radio link for short-range connections between different devices. Devices are equipped with a transceiver that transmits and receives in a frequency band around 2.45 GHz. This band is available globally with some variation of bandwidth depending on the country. Both data and voice channels are available. Each device has a unique 48-bit address from the IEEE 802 standard. Built-in encryption and verification is also available.

The element of the UMAN 102 adapted to communicate across the unlicensed radio interface is designated as an access point (AP) 134, 136, 138 and 140 (also referred to as a local or home base station (HBS)). The AP 134 handles the radio link protocols with MS 132 and contains radio transceivers that define a cell in a similar manner to the operation of a conventional GSM BTS 130. The AP 134 is controlled by a unlicensed network controller (UNC) 142, 144 or 146 (also referred to as a home base station controller (HBSC)), which communicates with MSC 110 over the GSM standard A interface and also with a serving GPRS support node SGSN 120 over a standard Gb interface, if available in the core network 104. The joint function of the AP 134 and the UNC 142 emulates the operation of the BSS 122 towards the SGSN 120 and MSC 110. In other words, when viewed from the elements of the core network 104 such as the MSC 110 and the serving GPRS support node (SGSN) 120, the UMAN 102 constituted by the APs 134, 136, 138 and 140 and the UNC 142 looks like a conventional access network 106.

The interface between the access points 134, etc. and the UNC 142 is preferably provided by a fixed link. The home base station (not shown, but can be integrated in the AP) is intended to be a small device that a subscriber can purchase and install in a desired location such as the home or an office environment to obtain a fixed access to the UMA network. However, they could also be installed by operators in traffic hotspots. In order to reduce the installation costs on the part of the operator, the interface between the home base station (not shown) and the UNC 142 preferably exploits an already existing connection provided by a fixed network 148. Preferably this network 148 is a broadband packet-switched network. Suitable networks might include those based on ADSL, Ethernet, LMDS, or the like. Home connections to such networks are increasingly available to subscribers.

Figure 2:
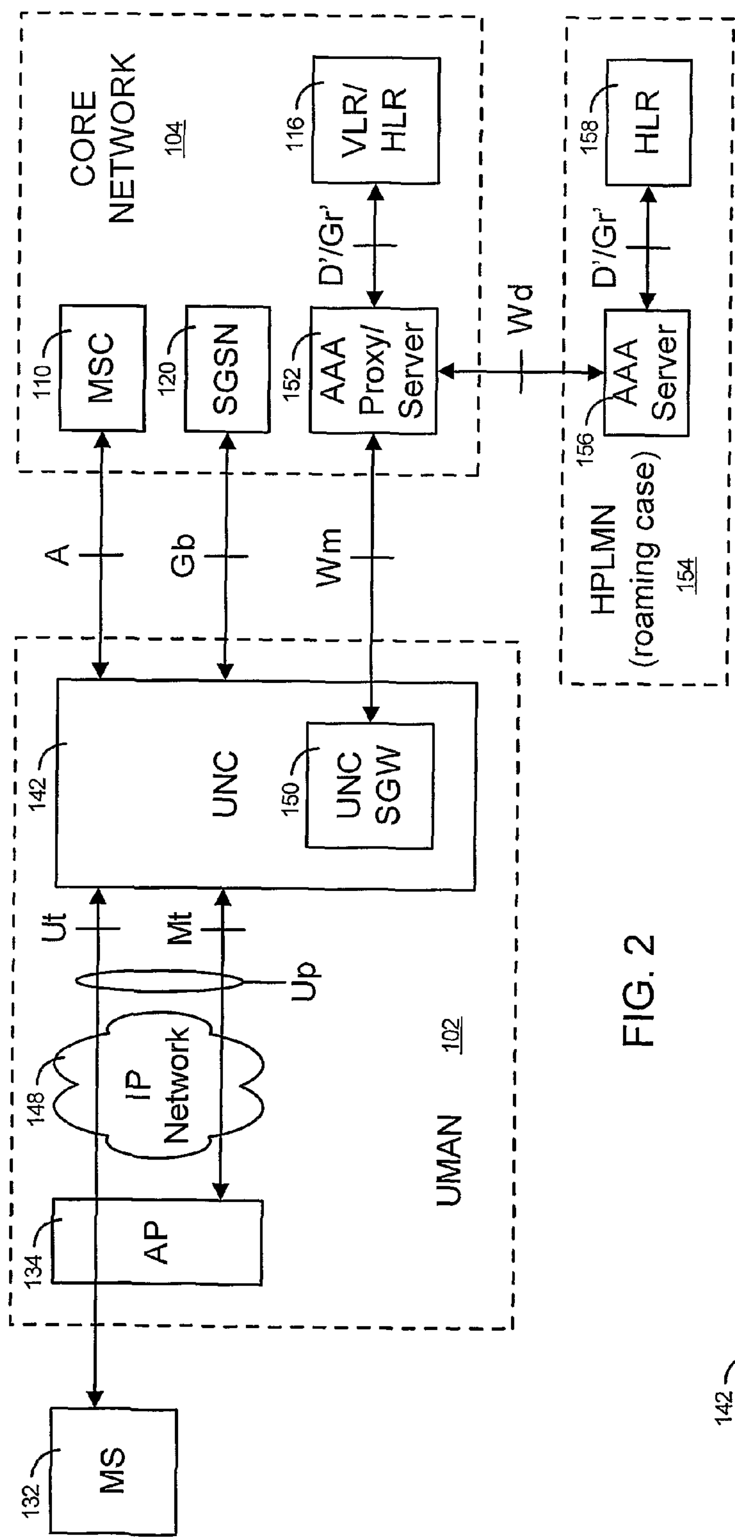
FIG. 2 is a block diagram of the UMA high level functional architecture.

Now referring to FIG. 2, a block diagram of the UMA high level functional architecture is shown. The UMAN 102 includes one or more APs 134 and one or more UNCs 142 (each having a Secure Gateway 150 (UNC SGW)), interconnected through a broadband IP network 148. The UNC SGW 150 terminates secure remote access tunnels from the MS 132 and provides mutual authentication, encryption and data integrity for signaling, voice and data traffic. Note that each UNC 142 can have multiple UNC SGWs, or a UNC SGW pool can serve multiple UNCs. The UMAN 102 co-exists with the GSM/GPRS radio access network and interconnects to the GSM core network 104 via the same interfaces used by a standard GERAN BSS network element: GSM A-interface for circuit switched services; GPRS Gb-interface for packet services; and Wm-interface for authentication, authorization and accounting. The UNC 142 appears to the GSM/GPRS core network 104 as a GERAN BSS. The principle elements of transaction control (e.g., call processing) and user services are provided by the network elements in the core network 104, namely the MSC 110, SGSN/GGSN 120, Authentication, Authorization and Accounting Proxy/Server 152 (AAA Proxy/Server) and the VLR/HLR 116. The AAA Proxy/

Server 152 interfaces with VLR/HLR 116 via D'/Gr' interface. Whenever the MS 132 is roaming, the GSM/GPRS core network 104 will interface with the MS's Home Public Land Mobile Network 154 (HPLMN). Specifically, AAA Proxy/Server 152 will interface with AAA Server 156 via Wd interface. The AAA Server 156 will interface with HLR 158 via D'/Gr' interface.

Broadband IP network 148 provides connectivity between the user premises and the UNC 142. An AP 134 in the user premises provides the radio link to the MS 132 using unlicensed spectrum. The IP transport network extends all the way from the UNC 142 to the MS 132, through an AP 134. A single interface, Ut, is defined between the UNC 142 and the MS 132. The Mt interface is an interface between the UNC 142 and the AP 134. This interface may be used for special functions in some realizations. The Ut and Mt interfaces are collectively referred to as the Up interface.

The MS 132 provides dual mode (licensed and unlicensed) radios and the capability to switch between them. The MS 132 supports an IP interface to the AP 134. In other words, the IP network from the UNC 142 extends all the way to the MS 132. The MS 132 is defined for Bluetooth (using the Bluetooth PAN profile) as well as for 802.11. The AP 134 provides the radio link towards the MS 132 using unlicensed spectrum and connects through the broadband IP network 148 to the UNC 142. The AP 134 provides Bluetooth (PAN profile) or 802.11 access point functions. The AP 134 may also use other radio access technologies, such as 802.16 or 802.20, etc. Any "standard" AP can be used to interconnect the MS 132 to the broadband IP network 148.

A UNC 142 connects to a unique MSC 110 and SGSN 120 via the A-interface and Gb interface respectively. This does not preclude support of A-flex and Gb-flex features. The UNC 142 provides functions equivalent to that of a GSM/GPRS BSC. The UNC 142 connects via the IP transport network 148 to the AP 134. The UNC 142 interfaces to the MS 132 using the Ut interface and maintains end-to-end communication with the MS 132 and relays GSM/GPRS signaling to the A/Gb interface towards the core network 104. The UNC 142 performs the following functions: transcoding voice to/from the MS 132 to PCM voice when TFO/TrFO features are not being utilized from/to the MSC 110; and the following Ut functionality: registration for UMA service access; set-up of UMA bearer paths for CS and PS services, including participation in establishment, management, and teardown of secure signaling and user plane bearers between the MS 132 and the UNC 142; UMA equivalent functionality for paging and handovers; and transparent transfer of L3 messages between the MS 132 and core network 104.

Figure 3:
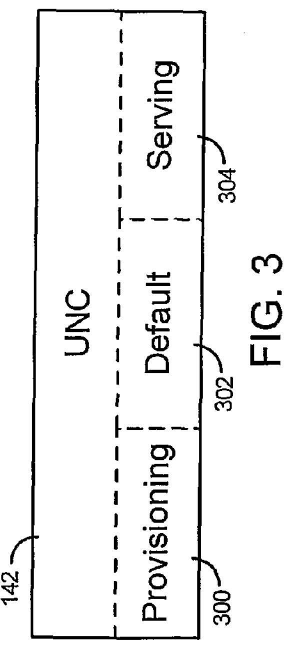
FIG. 3 is a block diagram depicting the logical roles of a UNC in accordance with the present invention.

Referring now to FIG. 3, a block diagram depicting the logical roles of a UNC 142 in accordance with the present invention is shown. As previously described, the present invention provides a UNC 142 that can perform one, two or all three logical functions (e.g., provisioning 300, default 302 and serving 304). This logical division of roles in the UMA network improves network performance, improves reliability and provides improved load balancing. Accordingly, the present invention provides various procedures performed by the MS and the different UNCs with respect to one another. In addition, the present invention provides a method for the MS to contact the provisioning UNC to discover the default UNC that will be used to find the correct serving UNC.

Figure 4:
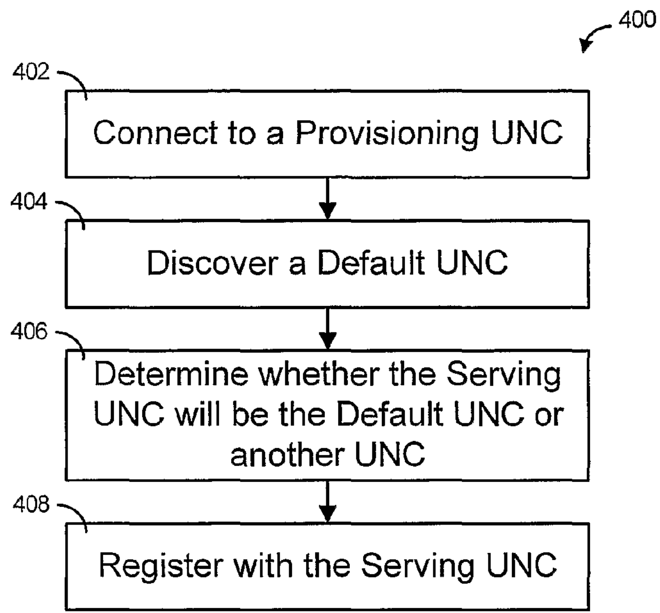
FIG. 4 is a flow chart depicting a basic method to assign a MS to a UNC in accordance with one embodiment of the present invention.

Now referring to FIG. 4, a flow chart depicting a basic method 400 to assign a MS to a UNC in accordance with one embodiment of the present invention is shown. When a MS supporting UMA first attempts to connect to a UNC based on a UMA subscription, it needs to identify the default UNC. In order to do this it first connects to a provisioning UNC and then discovers a default UNC, which in turn can redirect the MS to a serving UNC. More specifically, the MS connects to a provisioning UNC in block 402, and discovers with a default UNC in block 404. This is only done once, as long as, the default UNC is available. After discovering the default UNC, the MS disconnects from the provisioning UNC, connects to the default UNC and registers with the default UNC in block 404. A serving UNC is then determined to assign the MS to in block 406 and the MS is assigned to (registered with) the serving UNC in block 408. The serving UNC can be the default UNC, the provisioning UNC or another UNC. If the serving UNC is the default UNC, the registration step in block 408 was already performed in block 404. If, however, the serving UNC is not the default UNC, the MS is redirected to the serving UNC, disconnects from the default UNC, connects to the serving UNC and registers with the serving UNC in block 408.

Figure 5:
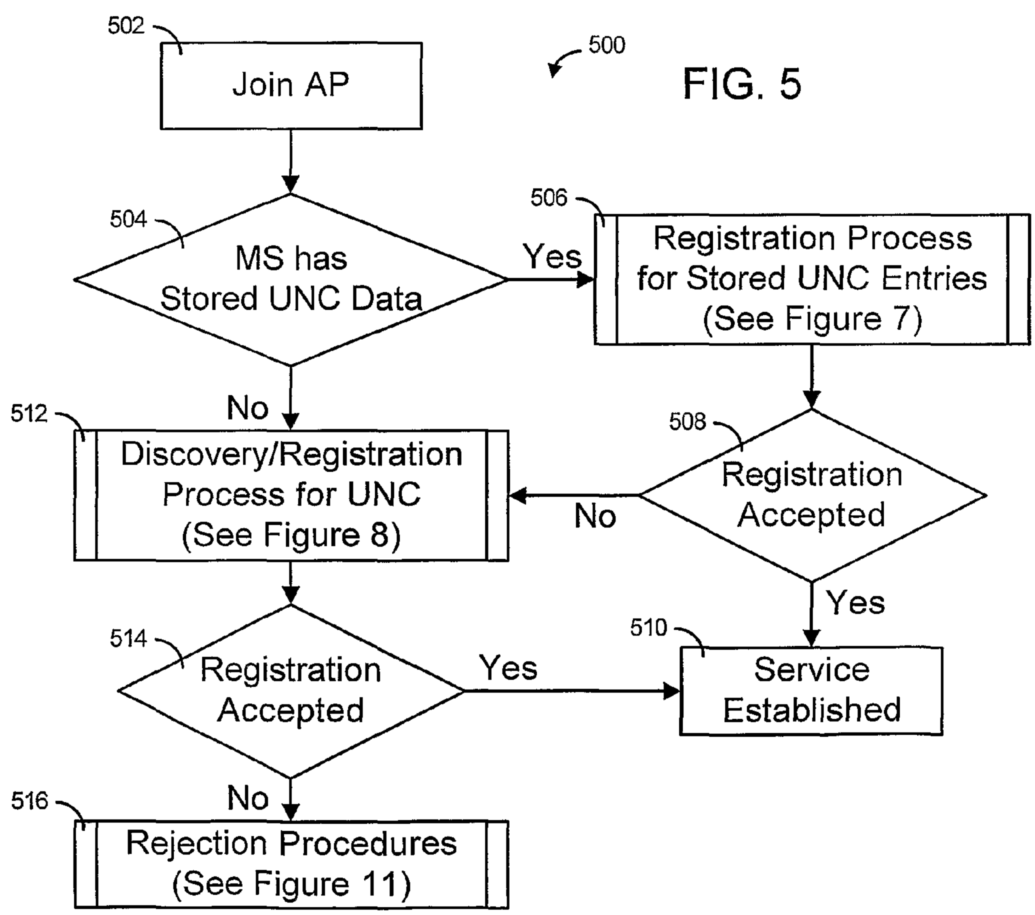
FIG. 5 is a flow chart depicting a more detailed method to assign a MS to a UNC in accordance with the present invention.

Referring now to FIG. 5, a flow chart depicting a more detailed method 500 to assign a MS to a UNC in accordance with the present invention is shown. The MS first joins an AP in block 502. If the MS has stored UNC data, as determined in decision block 504, the registration process for stored UNC entries is performed in block 506. This process is further described in reference to FIG. 7. If the registration was accepted, as determined in decision block 508, the service is established in block 510. If, however, the MS does not have stored UNC data for the joined AP, as determined in decision block 506, the discovery/registration process for the UNC is performed in block 512. This process is further described in reference to FIG. 8. If registration was accepted, as determined in decision block 514, service is established in block 510. If however, the registration was not accepted, as determined in decision block 514, so one or more rejection rules are executed in block 516. This process is further described in reference to FIG. 11.

Now referring to FIGS. 6A and 6B, representative signaling sequences in accordance with the present invention are depicted. The description below assumes that the MS has already joined an AP that provides the unlicensed radio access. It is implementation specific what signal level should be deemed as sufficient for triggering the UMAN Discovery and Registration procedures. The Discovery procedure is performed by the MS when first attempting to obtain UMA service in order to determine the identity of the default UNC which may also serve as the serving UNC for that connection.

A MS supporting UMA may be provisioned (e.g. on the SIM) with the fully qualified domain name (FQDN) or IP address of the provisioning UNC and the associated Security Gateway (SGW). In case the SIM is not provisioned with the FQDN or IP address, the MS shall derive a FQDN for the provisioning UNC and the secure gateway, based on ifs IMSI. The FQDN could, for example, comply with the following format:

Provisioned UNC-SGW: sgw.uma.mncnnn mccmmm uma.3gppnetwork.org

Provisioned UNC: punc.uma.mncnnn mccmmm uma.3gppnetwork.org where "nnn" and "mmm" are replaced with the IMSI MCC and MNC information in the SIM.

The MS shall set up a secure tunnel using the provisioned or derived address, and connect to the provisioning UNC. It shall then obtain the FQDN or IP address of the default UNC and the associated SGW, through the Discovery procedure. The default UNC serves as the primary registration destination address for the MS when it fails to register on an alternate serving UNC. These alternate serving UNC addresses are stored in the MS on the GSM CGI level when the MS is in GSM coverage or the AP level when there is no GSM coverage. Following the discovery procedure the MS shall establish a secure tunnel with the secure gateway of the default UNC and attempt to register with the default UNC. The default UNC network may also serve as the serving UNC for that connection. The procedure may result in the MS getting re-directed to a different serving UNC.

UNC redirection refers to the capability of a UNC to redirect an MS to a UNC distinct from the one it initially requests access to based on MS provided information and operator chosen policy. For example, the "appropriate" serving UNC is the UNC whose UMA service area "overlaps" the MS's umbrella GSM coverage. The correct serving UNC could be attached to the same MSC as the GSM BSC to which the umbrella GSM cell belongs. The correct serving UNC could be attached to a different MSC that can handover to the MSC which provides umbrella GSM coverage to the MS.

If no GSM coverage is available when an MS connects to the UNC for UMA service, then the UNC cannot reliably determine the location of the MS for the purposes of assigning the MS to the correct serving UNC (to enable handover and location-based services). The UNC shall permit the operator to determine the service policy in this case; e.g., the operator could provide service to the user with certain limitations (possibly with a user interface indication on the MS).

The MS is connected to the provisioning UNC by joining the MS to the UMAN via an access point (AP) and connecting the MS to the provisioning UNC via the AP. Each UNC is assigned one or more logical roles selected from a group of provisioning, default or serving. In addition, the present invention provides a method for assigning a MS to an UNC in an UMAN by joining the MS to the UMAN via an AP and attempting a discovery/registration process for one or more UNCs and assigning the MS to one of the UNC whenever the discovery/registration process is successful. The process also attempts a registration process for one or more previously connected UNC whose locations are stored on the MS and assigning the MS to the previously connected UNC whenever the registration process is successful. One or more rejection procedures can be executed whenever the discovery/registration process is unsuccessful. The above described methods can be implemented using a computer program embodied on a computer readable medium wherein each step is executed by one or more code segments.

Moreover, the present invention provides an apparatus within an UMA network that facilitates the assignment of one or more MSs within the UMA network. The apparatus includes an UNC that is assigned one or more logical roles selected from a group of provisioning, default or serving. The logical roles of provisioning, default and serving are distributed over one or more UNC.

The UNC is a provisioning UNC with respect to a first set of MS; a default UNC with respect to a second set of MSs, and a serving UNC with respect to a third set of MSs. Furthermore, the present invention provides an unlicensed-radio access system connected to a core network portion of a licensed mobile network. The unlicensed-radio access system includes one or more APs adapted to communicate with MSs over an unlicensed-radio interface, one or more UNC connected to the core network portion of the licensed mobile network and a fixed broadband network connected to both the APs and the UNCs, wherein the UNCs provide the logical roles of provisioning, default and serving in order to facilitate the assignment of the MSs within the UMA network.

651: If the MS 600 has a provisioned or derived FQDN of the provisioning SGW 606, it performs a DNS query 651 (via the AP that provides the unlicensed radio access) to resolve the FQDN to an IP address. If the MS 600 has a provisioned IP address for the provisioning SGW 606, the DNS step 651 and 652 will be omitted.

652: The DNS Server 602 returns a response.

653: The MS 600 establishes a secure tunnel to the provisioning SGW 606.

654: If the MS 600 has a provisioned or derived FQDN of the provisioning UNC 608, it performs a DNS query 654 (via the secure tunnel) to resolve the FQDN to an IP address. If the MS 600 has a provisioned IP address for the provisioning UNC 608, the DNS step will be omitted.

655: The DNS Server 610 returns a response 655.

656: The MS 600 establishes a TCP session to a well-defined port of the provisioning UNC 608.

657: The MS 600 queries the provisioning UNC 608 for the default UNC 615, using URR DISCOVERY REQUEST 657. The message contains:

GSM Cell Info;

Either current camping GSM CGI, or last CGI where the MS successfully registered, along with an indicator stating which one it is;

AP Identity;

The broadcast air-interface MAC address for the AP being used by the MS;

MS Identity;

IMSI.

658: The provisioning UNC 608 returns the URR DISCOVERY ACCEPT message 658, using the location information provided by the MS 600 (e.g. the CGI), to provide the FQDN or IP address of the default UNC 615 and its associated default SGW 614. This message can also contain a TCP port number to used against the default UNC 615. In addition, this is done so that the MS 600 is directed to a "local" default UNC to optimize network operations.

659: Alternately, the provisioning UNC 608 may return a URR DISCOVERY REJECT indicating the reject cause 659. Various causes may trigger a reject, including:

Network Congestion In this case the request can not be served right now. The MS 600 should wait for a random time before initiating a second attempt. For each successive failed attempt the MS 600 should double the waiting time. After 5 failed attempts, the MS 600 should restart the discovery procedure.

Location not allowed: The MS 600 is attempting to connect to an operator that does not have a roaming agreement with the home operator of the MS 600. The MS 600 shall not attempt any more discovery procedures from this forbidden location, i.e., country, PLMN or location indicated in the URR DISCOVERY REJECT message 659. The MS 600 can retry the discovery procedure with the stored provisioning UNC 608 (e.g., in the SIM) when it is no longer in a forbidden location.

UMA service not allowed: Operator policy determines that no UMA service is available. The MS 600 shall not re-attempt discovery on this UMA network. This condition shall be maintained until MS powers off.

IMSI not allowed: Operator policy determines that the IMSI is not allowed. The MS 600 shall not re-attempt discovery on this UMA network. This condition shall be maintained until MS powers off Unspecified: No cause is returned. The MS 600 shall not re-attempt discovery on this UMA network. This condition shall be maintained until MS powers off.

AP not allowed: Operator policy determines that no UMA service is available on this AP.

The MS 600 can retry the discovery procedure from another AP.

If the MS 600 fails to receive any response from the provisioning UNC 608, the MS 600 shall behave as if it received a URR DISCOVERY REJECT 659 with cause Network Congestion.

660: The first TCP connection 656 is then released 660.

661: If the provisioning UNC 608 and default UNC 616 are behind the same SGW, which in this case would be provisioning SGW 606, the same secure tunnel 653 can be used. Otherwise, the first secure tunnel 653 is released 660 and a new secure tunnel is established 662.

662: If the MS 600 was only provided the FQDN of the default SGW 614, the MS 600 shall first resolve the IP address through a DNS query (via WLAN interface). The MS 600 shall then set up a secure tunnel 662 to the default SGW 614. If the MS 600 was provided only the FDQN of the default UNC 616, the MS 600 shall then resolve the IP address through a DNS query (via the secure tunnel 662).

663: The MS 600 then sets up a TCP session 663 to a well-defined port or to the port returned in URR DISCOVERY ACCEPT 658 on the default UNC 616.

664: The MS 600 shall attempt to register on the default UNC 616 by transmitting the URR REGISTER REQUEST 664. The message contains:

GSM Cell Info;

Either current camping GSM CGI, or last CGI where the MS 600 successfully registered, along with an indicator stating which one it is;

AP Identity;

The broadcast air-interface MAC address for the AP being used by the MS 600;

MS Identity;

IMSI.

665: If the default UNC 616 wishes to re-direct the MS 600 to another serving UNC 624, it shall respond with a URR REGISTER REDIRECT 665 providing the FQDN or IP address of the target serving UNC 624 and associated SGW 622. Alternatively, the default UNC 616 may reject the registration and in this case the default UNC 616 shall respond with a URR REGISTER REJECT (not shown) indicating the reject cause. This could be triggered due to various causes such as:

Redirection due load balancing: The specific UNC is overloaded and the MS 600 is redirected to another UNC.

Network Congestion The MS 600 can not be served right now. The MS 600 shall wait for a random time before a second attempt. For each successive failed attempt the MS shall double the waiting time. After 5 failed attempts, the MS 600 shall re-initiate the registration procedure.

Restart discovery at provisioning UNC 608: The MS 600 shall re-initiate the discovery procedure by contacting the stored provisioning UNC 604 (e.g. in the SIM).

Location not allowed: The MS 600 shall not attempt to register with this UNC. The MS 600 can retry the discovery procedure with the stored provisioning UNC 608 (e.g. in the SIM).

UMA service not allowed: Operator policy determines that no UMA service is available. The MS 600 shall not re-attempt to register on this UMA network. This condition shall be maintained until MS 600 powers off.

AP not allowed: Operator policy determines that no UMA service is available on this AP. The MS 600 can retry the registration procedure from another AP.

Alternately, the default UNC 616 may return a URR REGISTER ACCEPT 664 to accept the registration, per step 668.

666: The second TCP connection 663 is then released 666.

667: If the default UNC 616 and serving UNC 624 are behind the same SGW, which in this case would be provisioning SGW 614, the same secure tunnel 662 can be used. Otherwise, the first secure tunnel 662 is released 667 and a new secure tunnel is established 668.

668: If the MS 600 was redirected and only provided the FQDN of the serving SGW 622, the MS 600 shall first resolve the IP address through a DNS query (via WLAN interface). The MS 600 shall then set up a secure tunnel to the serving SGW 622. If the MS 600 was provided only the FDQN of the serving UNC 624, the MS 600 shall then resolve the IP address through a DNS query (via the secure tunnel). The MS 600 then sets up a TCP session to a well-defined port on the serving UNC 624.

669: The MS 600 shall attempt to register on the serving UNC 624 by transmitting the URR REGISTER REQUEST 669. The message contains:

GSM Cell Info: Either current camping GSM CGI, or last CGI where the MS 600 successfully registered, along with an indicator stating which one it is.

AP Identity: The broadcast air-interface MAC address for the AP being used by the MS 600.

MS Identity: IMSI.

670: If the serving UNC 624 accepts the registration attempt it shall respond with a URR REGISTER ACCEPT 670. The message contains:

Cell description comprising the BCCH ARFCN, PLMN color code, and base-station color code;

Location-area identification comprising the mobile country code, mobile network code, and location area code corresponding to the UNC cell;

Cell identity identifies the cell within the location area.

671: Alternately, the serving UNC 624 may reject the request or redirect the MS 600 to another serving UNC 624.

Referring now to FIG. 7, a flow chart depicting a registration process 506 for UNC entries stored in a MS in accordance with one embodiment of the present invention is shown. The MS shall store (e.g. on the SIM) the address of the provisioning UNC and of the default UNC (along with the associated SGWs). The MS shall also store on the GSM CGI level when the MS is in GSM coverage or the AP level when there is no GSM coverage (e.g. on the SIM) the following information on each previously UNC for which the MS was able to complete a successful registration procedure. These alternate serving UNC addresses are stored in the MS.

Cell Global Identity (CGI) of the GSM cell the MS was on prior to registration;

Serving SGW identity address received following successful registration;

Serving UNC IP Address received following successful registration.

The number of such entries to be stored in the MS can be one or several. For a particular AP, only the last successfully registered UNC association shall be stored. A MS may preferentially join a WLAN AP whose association with a serving UNC has been stored in memory.

On joining a WLAN if the MS is in GSM coverage, as determined in decision block 700, and has stored serving UNC information for the current GSM CGI, as determined in decision block 702, the MS shall attempt to register with the serving UNC by establishing a secure tunnel to the serving SGW in block 706. If, however, the MS is not in GSM coverage, as determined in decision block 700, and has stored serving UNC information for the current AP ID, as determined in decision block 704, the MS shall attempt to register with the serving UNC by establishing a secure tunnel to the serving SGW in block 706.

After the secure tunnel is established in block 706, the MS sets up a TCP session to port on the serving UNC in block 708 and requests registration on the serving UNC in block 710. If the UNC accepts the MS, registration is completed and service is established in block 712. If the UNC redirects the MS to another UNC, a secure tunnel is established in block 706 and process repeats as herein described. The UNC may still reject the MS for any reason even though it may have served the MS before. In such a case, the MS shall delete from its stored list the address of the serving UNC on receiving a registration reject in block 714.

If the MS does not receive a response to the Registration Request sent to the serving UNC, the entry is deleted in block 714. Thereafter, or if the MS has not stored serving UNC information for the current GSM CGI, as determined in decision block 702, or has not stored serving UNC information for the current AP ID, as determined in decision block 704, the MS will check for stored entries for the default UNC, as determined in decision block 716. If the MS does not have stored entries for the default UNC, it shall attempt the discovery/registration procedure with the provisioning UNC in order to obtain a new default UNC in block 718. This process is described in more detail in reference to FIG. 8.

If, however, the MS does have stored entries for the default UNC, as determined in decision block 716, the MS shall attempt to register with the default UNC in order to obtain a new serving UNC for the joined AP by establishing a secure tunnel to the default SGW in block 720, setting up a TCP session to port on the default UNC in block 722 and request registration on the default UNC in block 724. If the request is accepted, the registration is completed and service is established in block 712. If the UNC redirects the MS to another UNC, a secure tunnel is established in block 706 and process repeats as herein described. If the request is rejected or the MS does not receive a response to the registration request sent to the default UNC, for a length of time, the default UNC is deleted from the stored list in block 726. The MS shall then attempt the discovery/registration procedure with the provisioning UNC in order to obtain a new default UNC in block 718. This process is described in more detail in reference to FIG. 8.

Now referring to FIGS. 8, 9 and 10, flow charts depicting a UNC discovery/registration process 512 (FIG. 5) and 718 (FIG. 7) for a MS in accordance with one embodiment of the present invention are shown. When the MS joins a WLAN, for which it does not have a stored serving UNC in its memory, it shall attempt to register with the default UNC. The Discovery and Registration procedures consist of the following steps:

Joining a WLAN;

Discovery of Default UNC, through the Provisioning UNC;

Registration with the Default UNC;

Potential redirection to a Serving UNC or rejection;

Registration with a Serving UNC.

Through the Registration procedure the MS may get re-directed to another serving UNC.

This could be based on the following, among other reasons:

Current location indicated through the overlapping GERAN Cell Global Identity or other location attributes;

Indication of joined AP;

Load balancing in the NW;

Operator Policy;

Roaming agreements in case of a roaming MS.

A successful registration procedure results in the UNC establishing a context for the MS. The MS obtains the necessary system information for the UMAN it has registered on and can trigger a normal Location/Routing Area Update procedure with the CN.

More specifically, if the MS has a provisioned or derived FQDN of the provisioning SGW at 800, the MS will perform a DNS Query to resolve the FQDN to an IP address for the provisioning SGW in block 802. Thereafter, or if the MS has a provisioned IP address for the provisioning SGW at 804, a secure tunnel is established to the provisioning SGW in block 806. Thereafter, if the MS has a provisioned or derived FQDN of the provisioning UNC at 808, the MS will perform a DNS Query to resolve the FQDN to an IP address for the provisioning UNC in block 810. Thereafter, or if the MS has a provisioned IP address for the provisioning UNC at 812, a TCP connection is established to the provisioning UNC in block 814 and the provisioning UNC is queried for the default UNC in block 816. If there is no response, the no response procedures are executed in block 810. If the query is rejected, the rejection procedures are executed in block 820. The no response procedures 810 and rejection procedures 820 are described in more detail in reference to FIG. 11.

If the query is accepted and an IP address for the default UNC is received based on MS location information at 822, a secure tunnel to the default SGW is established in block 826. On the other hand, if the query is accepted and an FQDN of the default UNC and associated default SGW is received based on MS location information at 824, a DNS query is performed to resolve the FQDN to an IP address for the default SGW in block 828 and a secure tunnel to the default SGW is established in block 830. If the MS has a FQDN of the default UNC at 832, a DNS query is performed to resolve the FQDN to an IP address for the default UNC in block 834. Thereafter, or if the MS has an IP address for the default UNC at 836, or the secure tunnel has been established in block 826, a TCP session to port on the default UNC is set up in block 838. The MS then requests registration on the default UNC in block 840.

If the request is accepted, the registration is completed and service is established in block 842. If there is no response, the no response procedures are executed in block 844. If the request is rejected, the rejection procedures are executed in block 846. The no response procedures 844 and rejection procedures 846 are described in more detail in reference to FIG. 11. If a re-direct is received along with an IP address for the serving UNC and associated serving SGW at 848, a secure tunnel to the serving SGW is established in block 852. On the other hand, if the re-direct is received along with a FDQN of the serving UNC and associated serving SGW at 850, a DNS query is performed to resolve the FQDN to an IP address for the serving SGW in block 854 and a secure tunnel to the serving SGW is established in block 856. If the MS has a FQDN of the serving UNC at 858, a DNS query is performed to resolve the FQDN to an IP address for the serving UNC in block 860. Thereafter, or if the MS has an IP address for the serving UNC at 862, or the secure tunnel was established in block 852, a TCP session to port on the serving UNC is set up in block 864. The MS then requests registration on the serving UNC in block 866.

If the request is accepted, the registration is completed and service is established in block 868. If there is no response, the no response procedures are executed in block 870. If the request is rejected, the rejection procedures are executed in block 872. The no response procedures 870 and rejection procedures 872 are described in more detail in reference to FIG. 11. If a re-direct is received the process repeats at points 874 to 848 and 876 to 850.

Referring now to FIG. 11, a flow chart depicting rejection procedures 516 (FIG. 5), 820 (FIG. 8), 846 (FIG. 9) and 872 (FIG. 10) and no response procedures 818 (FIG. 8), 844 (FIG. 9) and 870 (FIG. 10) in accordance with one embodiment of the present invention is shown. If the rejection is network congestion or there is no response, and no previous attempt has failed, as determined in decision block 900, the MS will wait before initiating the next discovery or registration attempt in block 902. If, however, a previous attempt has failed, as determined in decision block 900, and there have been less than five failed attempts, as determined in decision block 904, the waiting time will be doubled in block 906 and the MS will wait before initiating the next discovery or registration attempt in block 902. If, however, there have been five failed attempts, as determined in decision block 904, the discovery or registration process is restarted in block 908.

If the rejection was Location Not Allowed, the MS will not attempt discovery or registration from this forbidden location, i.e., country, PLMN or location indicated in the URR DISCOVERY REJECT message, in block 910 and the MS can retry discovery or registration procedure with a stored provisioning UNC in block 912 when it is no longer in a forbidden location. If the rejection was AP Not Allowed, no service is available on the joined AP in block 914 and the MS can retry discovery or registration procedure on another AP in block 916. If the rejection was Redirection Due to Load Balancing, the MS is re-directed to another UNC in block 918. If the rejection was Restart Discovery at Provisioning UNC, the MS restarts the discovery procedure by contacting the stored provisioning UNC in block 920. If the rejection was UMA Service Not Allowed or IMSI Not Allowed or the rejection is Unspecified, no service is available and no re-attempts to register are allowed in block 922.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification, but only by the claims.

The invention claimed is:

1. A method for assigning a mobile station to an unlicensed mobile access network controller in an unlicensed radio access network, the method comprising:

the mobile station joining an access point;

determining whether the mobile station has stored unlicensed mobile access network controller data;

in response to determining that the mobile station has stored unlicensed mobile access network controller data, performing a registration process for stored an unlicensed mobile access network controller corresponding to the stored unlicensed mobile access network controller data;

in response to determining that the mobile station does not have stored unlicensed mobile access network controller data, performing a discovery/registration process for an unlicensed mobile access network controller, wherein the discovery/registration process enables the mobile station to determine an identity of a default unlicensed mobile access network controller to act as a serving unlicensed mobile access network controller;

in response to performing the discovery/registration process, determining if a registration of the mobile station is accepted; and in response to determining that the registration of the mobile station is accepted, establishing service for the mobile station;

wherein performing a discovery/registration process for an unlicensed mobile access network controller comprises: retrieving an internet protocol (IP) address of a provisioning secure gateway (SGW);

establishing a secure tunnel to the provisioning SGW;

retrieving an IP address of a provisioning unlicensed mobile network controller;

setting up a transmission control protocol (TCP) session to a port on the provisioning unlicensed mobile network controller;

sending a query to the provisioning unlicensed mobile network controller for a default unlicensed mobile network controller;

if the query does not receive a response, executing a no-response procedure and if the query is rejected, executing a rejection procedure.

2. The method according to claim 1, further comprising:

in response to determine that the registration of the mobile station is not accepted, executing a rejection procedure.

3. The method according to claim 2, wherein executing a rejection procedure further comprises:

if the registration of the mobile station is not accepted because the mobile station is not allowed to register at a current location, retrying a discovery or registration procedure with provisioning unlicensed mobile network controller data stored in the mobile station;

if the registration of the mobile station is not accepted because the access point is not allowed, retrying a discovery or registration procedure on another access point;

if the registration of the mobile station is not accepted because of redirection due to load balancing, redirecting the mobile station to another unlicensed mobile network controller;

if the registration of the mobile station is not accepted due to a restart of discovery at a provisioning unlicensed mobile network controller, restarting a discovery procedure with provisioning unlicensed mobile network controller data stored in the mobile station; and if the registration of the mobile station is not accepted because unlicensed mobile access (UMA) service is not allowed or an international mobile subscriber identity (IMSI) is not allowed or unspecified, not allowing service to the mobile station and refusing re-attempts to register.

4. The method according to claim 3, wherein executing a rejection procedure further comprises:

if the registration of the mobile station is not accepted due to network congestion, restarting a discovery or registration process after a predetermined amount of time.

5. The method according to claim 1, wherein performing the registration process for stored unlicensed mobile access network controller data further comprises:

retrieving unlicensed mobile access network controller data stored in the mobile station, wherein the unlicensed mobile access network controller data is serving unlicensed mobile access network controller data;

establishing a secure tunnel to a serving secure gateway (SGW);

setting up a transmission control protocol (TCP) session to a port on the service unlicensed mobile network controller corresponding to the serving unlicensed mobile access network controller data;

requesting registration on the serving unlicensed mobile network controller;

if the requested registration on the serving unlicensed mobile network controller is rejected or did not receive a response, deleting the serving unlicensed mobile access network controller data from the mobile station; and if the requested registration on the serving unlicensed mobile network controller is accepted, completing registration and establishing service for the mobile station.

6. The method according to claim 5, further comprising:

if the requested registration on the serving unlicensed mobile network controller is redirected to a second unlicensed mobile network controller, establishing a secure tunnel to the serving SGW, setting up a TCP session to a port on the second unlicensed mobile network controller, and requesting registration on the second unlicensed mobile network controller.

7. The method according to claim 1, wherein performing the registration process for stored unlicensed mobile access network controller data further comprises:

retrieving unlicensed mobile access network controller data stored in the mobile station, wherein the unlicensed mobile access network controller data is default unlicensed mobile access network controller data;

establishing a secure tunnel to a default secure gateway (SGW);

setting up a transmission control protocol (TCP) session to a port on a default unlicensed mobile network controller corresponding to the default unlicensed mobile access network controller data;

requesting registration on the default unlicensed mobile network controller;

if the requested registration on the default unlicensed mobile network controller is rejected or did not receive a response, deleting the default unlicensed mobile access network controller data from the mobile station;

if the requested registration on the default unlicensed mobile network controller is accepted, completing registration and establishing service for the mobile station.

8. The method according to claim 7, further comprising:

if the requested registration on the default unlicensed mobile network controller is redirected to a second unlicensed mobile network controller, establishing a secure tunnel to the serving SGW, setting up a TCP session to a port on the second unlicensed mobile network controller, and requesting registration on the second unlicensed mobile network controller.

9. The method according to claim 1, further comprising if the query is accepted, receiving an IP address of the default unlicensed mobile network controller and an associated default SGW based on a location of the mobile station;

establishing a secure tunnel to the default SGW;

setting up a TCP session to a port on the default unlicensed mobile network controller;

requesting registration on the default unlicensed mobile network controller;

if the requested registration on the default unlicensed mobile network controller is accepted, completing registration and establishing service to the mobile station;

if the requested registration on the default unlicensed mobile network controller does not receive a response, executing the no-response procedure; and if the requested registration on the default unlicensed mobile network controller is rejected, executing the rejection procedure.

10. The method according to claim 9, further comprising:

if the requested registration on the default unlicensed mobile network controller is redirected, retrieving an internet protocol (IP) address of a serving SGW;

establishing a secure tunnel to the serving SGW;

retrieving an IP address of a serving unlicensed mobile network controller;

setting up a transmission control protocol (TCP) session to a port on the serving unlicensed mobile network controller;

requesting registration on the serving unlicensed mobile network controller;

if the requested registration on the serving unlicensed mobile network controller is accepted, completing registration and establishing service to the mobile station;

if the requested registration on the serving unlicensed mobile network controller does not receive a response, executing the no-response procedure;

if the requested registration on the serving unlicensed mobile network controller is rejected, executing the rejection procedure; and if the requested registration on the serving unlicensed mobile network controller is redirected, receiving an IP address of another serving SGW.

11. The method according to claim 1, wherein executing a no-response procedure further comprises:

restarting a discovery or registration process after a predetermined amount of time.

* * * * *

UNITED STATES PATENT AND TRADEMARK OFFICE

CERTIFICATE OF CORRECTION

PATENT NO. : 8,249,594 B2
APPLICATION NO. : 13/046880
DATED : August 21, 2012
INVENTOR(S) : Vikberg et al.

It is certified that error appears in the above-identified patent and that said Letters Patent is hereby corrected as shown below:

In Column 5, Line 41, delete “$A_{bs}$” and insert -- $A_{bis}$ --, therefor.

In Column 8, Line 52, delete “ifs” and insert -- its --, therefor.

In Column 8, Lines 55-56, delete “sgw.uma.mncnnn mccmmm uma.3gppnetwork.org” and insert -- sgw.uma.mncnnn.mccmmm.uma.3gppnetwork.org --, therefor.

In Column 8, Lines 57-58, delete “punc.uma.mncnnn mccmmm uma.3gppnetwork.org” and insert -- punc.uma.mncnnn.mccmmm.uma.3gppnetwork.org --, therefor.

In Column 10, Line 39, delete “Congestion” and insert -- Congestion: --, therefor.

In Column 10, Line 59, delete “off” and insert -- off. --, therefor.

In Column 10, Lines 62-63, delete “UMA network....powers off.” and insert the same at Line 61, after “discovery on this” as a continuation.

In Column 11, Line 15, delete “FDQN” and insert -- FQDN --, therefor.

In Column 11, Line 43, delete “Congestion” and insert -- Congestion: --, therefor.

In Column 12, Line 7, delete “FDQN” and insert -- FQDN --, therefor.

In Column 14, Line 42, delete “FDQN” and insert -- FQDN --, therefor.

Signed and Sealed this
Ninth Day of April, 2013

Teresa Stanek Rea
*Acting Director of the United States Patent and Trademark Office*